United States Patent [19]

Cheetham et al.

[11] 4,173,486

[45] Nov. 6, 1979

[54] COATING OF GLASS FIBRES

[75] Inventors: Colin J. Cheetham, Ormskirk; Phillip Maguire, Liverpool, both of England

[73] Assignee: Pilkington Brothers Limited, St. Helens, England

[21] Appl. No.: 849,578

[22] Filed: Nov. 8, 1977

[30] Foreign Application Priority Data

Nov. 11, 1976 [GB] United Kingdom ............... 47071/76

[51] Int. Cl.$^2$ ........................... C04B 7/02; C08J 3/00; D02G 3/00; B05D 3/02
[52] U.S. Cl. ......................................... 106/99; 106/98; 260/29.2 EP; 260/29.4 R; 427/386; 427/390 A; 428/375; 428/391; 428/392
[58] Field of Search ............... 427/386, 390 A; 260/29.2 EP, 29.4 R; 106/99, 50, 98; 428/375, 391, 392

[56] References Cited

U.S. PATENT DOCUMENTS

| | | | |
|---|---|---|---|
| 3,211,579 | 10/1965 | Reiter .................................. | 427/386 X |
| 3,336,253 | 8/1967 | Wong et al. ..................... | 260/29.2 EP |
| 3,920,596 | 11/1975 | Furukawa et al. ............... | 427/390 X |
| 3,948,673 | 4/1976 | Chase et al. ........................ | 106/99 |
| 4,009,132 | 2/1977 | Furukawa et al. ............... | 427/390 X |
| 4,044,178 | 8/1977 | Abel et al. ........................ | 427/390 X |
| 4,062,690 | 12/1977 | Litherland et al. ............... | 106/99 X |
| 4,067,835 | 1/1978 | Takamori et al. ............... | 427/390 X |

*Primary Examiner*—Michael R. Lusignan
*Attorney, Agent, or Firm*—Sughrue, Rothwell, Mion, Zinn and Macpeak

[57] ABSTRACT

A method of coating glass fibres to protect them from deterioration in an alkaline environment such as a Portland cement matrix, in which the glass fibres are coated with a composition containing a water-soluble film-forming material having free aliphatic hydroxyl groups in the molecule, a water-soluble ester formed by reaction of a tri-hydroxy- or di-hydroxy-substituted aromatic carboxylic acid with an alcohol having at least two hydroxyl groups in the molecule, and a cross-linking agent, the composition is cured and dried at elevated temperature so as to cross-link hydroxyl groups of the film-forming material and thereby form a thermoset film coating on the glass fibres which also retains the ester. The ester acts as a protective material to protect the glass fibres from alkaline attack.

22 Claims, No Drawings

COATING OF GLASS FIBRES

BACKGROUND OF THE INVENTION

1. Field of the Invention

This invention relates to the coating of glass fibres, and more particularly to a method of coating glass fibres to protect them from deterioration in an alkaline environment, such as a Portland cement matrix. The invention also relates to glass fibres coated by the method of the invention, to an aqueous coating composition for use in the method of the invention and to cement composite materials formed by incorporating the coated glass fibres in a cement matrix.

2. Description of the Prior Art

The use of glass fibres as a reinforcing material in cement has become practicable since the development of alkali-resistant glass fibres such as those made from glass compositions as described and claimed in our British Patent specification No. 1,290,528 and sold under the Trade Mark "Cem-FIL" by Fibreglass Limited. Alkali-resistant glass fibres may be of varying durability according to the composition of the glass from which it is formed. The aggressiveness of the environment may also vary; for example, the durability obtained under dry conditions is better than that achieved when glass fibre reinforced cement composites are exposed to natural weathering in the open. It can be necessary in some circumstances to achieve a greater durability than is possible by alterations in glass composition, or to improve the durability of a glass without increasing the cost of the batch ingredients. We have described in our British Patent specification No. 1,465,059 the use of coating compositions for glass fibres comprising a protective material to reduce deterioration of the glass fibres when incorporated in cementitious products, the protective material consisting of at least one monocyclic or polycyclic aromatic compound which has at least three hydroxyl groups on the aromatic ring or, in a polycyclic compound, on at least one of the aromatic rings. We have found such protective materials to confer on the glass fibres increased durability in an inorganic cement matrix. Co-pending United States Patent Application Ser. No. 708,977, now U.S. Pat. No. 4,123,287, describes the use of coating compositions containing, as a protective material, at least one dihydroxybenzoic acid which we have found to confer increased durability on glass fibres in an inorganic cement matrix. Co-pending United States Patent Application Ser. No. 646,082, now U.S. Pat. No. 4,062,690, describes a method of increasing the effect of the protective materials described in our British Patent specification No. 1,465,059 or U.S. Application Ser. No. 708,977, by incorporating them into a coating composition with a partially-cured A-stage phenol-formaldehyde resin of the water-dilutable resole type, which is subsequently cured. This is believed to trap the protective material, probably by both chemical and physical means, in the cured resin matrix, from which it can be slowly released.

If the protective material, i.e., the hydroxy compound or compounds, is merely dispersed in a carrier and then coated on to the fibre, it has been found difficult to ensure that the material remains on, or in the vicinity of, the fibre surface during the various operations carried out during the formation of a cement composite.

SUMMARY OF THE INVENTION

We believe that in order to obtain further improvements in durability over those obtained by merely dispersing the protective material in a carrier, it is necessary to ensure that the carrier reacts with the protective material chemically, or physically holds the protective material in the vicinity of the fibre surface, in such a manner that the protective material can be released by the effect of the environment on the coated surface of the fibre.

According to the invention a method of coating glass fibres to protect them from deterioration in an alkaline environment, such as a Portland cement matrix, comprises the steps of applying to the glass fibres an aqueous composition containing a water-soluble film-forming material having free aliphatic hydroxyl groups in the molecule, a water-soluble ester formed by reaction of a tri-hydroxy- or di-hydroxy-substituted aromatic carboxylic acid with an alcohol having at least two hydroxyl groups in the molecule, and a cross-linking agent, and drying and curing the composition at elevated temperature so as to cause cross-linking of the hydroxyl groups of the film-forming material, thereby to form a thermoset film coating on the glass fibres which also retains the ester.

The reaction to form the ester is preferably carried out in such a manner that the ester contains at least one free (i.e., unreacted) aliphatic hydroxyl group in the molecule, because of its beneficial effect on the water solubility of the ester. In the drying and curing step, it is believed that the cross-linking agent will then generally also cause cross-linking of the aliphatic hydroxyl group or groups of the ester with hydroxyl groups of the film-forming material.

When glass fibres are coated in accordance with the method of the invention, the ester which forms the protective material is found to give a considerably enhanced effect in protecting the glass fibres when they are incorporated in a cement composite material. It is not clear whether the effect is achieved by preventing or considerably reducing the attack on the glass fibre during the initial setting of the cement by slow release of the protective material during this period, or whether in fact the protective material is released over a longer period. However it seems clear that by retaining the protective material (the ester) in the coating composition by means of the invention we can achieve a better retention of strength by the composite, and reduce to a considerable degree the rate of loss of strength compared to that experienced using an alkali-resistant fibre without any protective coating, or even an alkali-resistant fibre having a protective material dispersed in a carrier and coated on to it.

Preferably the film-forming material is the product of reacting an epoxide compound with a secondary amine in such manner as to remove all the epoxy groups originally present, though in some cases it may be convenient to remove only such a proportion of the epoxy groups originally present as is necessary to make the product soluble in water or in dilute organic acids, such as acetic acid. In either case, the epoxide compound is preferably a product of reacting bisphenol A with epichlorhydrin. The secondary amine may be diethanolamine, morpholine, piperidine or pyrrole.

The film-forming material may alternatively be the product of reacting epichlorhydrin with a secondary amine and subsequently reacting the product with a primary hydroxy amine such as ethanolamine.

The ester is preferably an ester of gallic acid, though it may also be an ester of a dihydroxybenzoic acid. The esterifying alcohol may be ethylene glycol, glycerol or a polyethylene glycol with a molecular weight below 600.

The cross-linking agent is preferably an amino-plast, having one or more melamine rings and substituted with methylol and/or esterified methylol groups. The esterified methylol groups are preferably esterified with methanol.

The method of coating according to the invention is particularly applicable to the coating of glass fibre in the form known as continuous filament, which is the form principally used for glass reinforcement of cement products. For this application, the aqueous composition is preferably applied to continuous filaments of glass as the filaments are being drawn from a body of molten glass through multiple orifices or tips in the base of a bushing. The filaments are grouped together into bundles of filaments or strands and wound on to a former to give a cake. The cakes are dried and at the same time the curing reaction can take place. We prefer to dry (and cure) at at least 120° C., preferably 130° C., preferably for 6 to 12 hours. The exact choice of conditions is dependent on the size of the cake.

In this case, the aqueous composition preferably also contains a silane which assists in bonding the film-forming material to the glass surface, and it may also contain a size lubricant to reduce friction between the coated surfaces of adjacent filaments.

The invention also includes glass fibres coated by a method as outlined above.

The invention further comprises an aqueous coating composition for use in coating glass fibres by the method outlined above, said composition containing a water-soluble film-forming material having free aliphatic hydroxyl groups in the molecule, a water-soluble ester formed by reaction of a tri-hydroxy- or di-hydroxy-substituted aromatic carboxylic acid with an alcohol having at least two hydroxyl groups in the molecule, and a cross-linking agent.

The invention further includes a cement composite material formed by incorporating glass fibres coated in accordance with the invention in an inorganic cement matrix.

It has already been proposed to improve the strength retention of alkali-resistant glass fibres in an inorganic cement matrix through incorporation of reactive silica in the form of a pozzolanic material. For example, British Patent specification No. 1,402,555 describes the use of Italian pozzolana and pulverized fly ash (PFA). We have found that the addition to the cement of a reactive silica, when used in conjunction with the coated fibre of the present invention, produces a greater improvement in strength retention than that to be expected by merely adding one improvement to the other.

We find in general that up to 40% of the cement used can be replaced with an active silica. We believe the lower useful limit to be about 10%, but both upper and lower limits are dependent to some extent on the nature of the material used, the upper limit being related to water demand and matrix strength, the lower limit to the reactivity of the active silica used.

DETAILED DESCRIPTION OF THE INVENTION

In formulating coating compositions so that they are suitable for coating all forms of glass fibre, in particular that form known as continuous filament, various criteria must be met. The most rigorous requirements are probably those for a coating which can be applied as a size to continuous glass filaments as they are drawn from a bushing. In this case it is necessary to achieve a film over the surface of the glass filaments, which will protect the glass from physical damage during further processing, such as when the filaments are combined into a strand which is wound into a roving or as the strand or roving is fed to a chopper. This film must also help the individual filaments to adhere to one another to form a fibre strand or bundle. The filaments are formed by mechanically attenuating streams of molten glass leaving orifices known as tips in the base of a platinum vessel known as a bushing, which is at a very high temperature, and the size must be applied to the glass filaments as they are drawn from the bushing. In order to achieve safety and suitable working conditions, it is preferable to avoid systems which use, as a liquid carrier, organic solvents of any kind, or substantial proportions of such solvents in aqueous systems. Our present invention is therefore based on the development of an aqueous size which meets the various criteria dictated by the processing requirements in the sizing of continuously formed glass filaments, and also provides, when dried and heat treated, a coating on the filament which contains a material capable of increasing the durability of the glass fibres in an alkaline environment such as an inorganic cement matrix.

The aqueous size consists essentially of
(a) at least one water soluble film forming material having free hydroxyl groups,
(b) at least one water soluble ester formed by reaction of a tri-hydroxy or di-hydroxy substituted aromatic carboxylic acid with an alcohol having at least two hydroxyl groups, and
(c) a cross-linking agent capable of cross-linking the hydroxyl groups of the film-forming material to make it thermosetting, and possibly also cross-linking the ester into the film-forming material.

Suitable water soluble film forming materials with free hydroxyl groups include materials produced by reacting epoxy resins with a secondary amine, either to remove all the epoxy groups present in the resin or a proportion of such groups as is necessary to confer water solubility or make the resin soluble in dilute organic acids such as acetic acid. The epoxy resins are in general produced by reacting Bisphenol A with epichlorhydrin. By using differing ratios of these materials with varying amounts of alkali catalyst, it is possible to obtain polymers of different molecular weights. Suitable secondary amines include diethanolamine, morpholine, piperidine and pyrrole. Resins can also be made by reacting epichlorhydrin directly with a secondary amine such as di-n-butylamine, and then reacting the product with a primary hydroxy amine such as ethanolamine. The solubilisation of epoxy resins is described in British Patent specifications 1,129,005, 1,103,325 and 1,057,292 and the materials described in those specifications, produced by reacting an epoxy resin with an amine, are suitable for use as the film-forming material of the present invention. We prefer to use a material formed from the reaction of epoxide compounds of the kind described in the above specifications and secondary amines, the reaction having been carried out so as to ensure that there is substantially complete reaction and no epoxy groups can be detected by standard analytical techniques. Other film-forming materials include polyhydric alcohols such as polyvinyl alcohols or partially hydrolysed polyvinyl acetates.

In the preferred embodiments of the invention, as mentioned above, the ester of the hydroxy-substituted carboxylic acid contains at least one free, i.e., unreacted, hydroxyl group in addition to the esterified group, so as to promote the water solubility of the ester. It is believed that the free hydroxyl group is also capable of reacting with the cross-linking agent to link the ester to the water-soluble film former, and thereby to improve retention of the ester in the coating. The cross-linking agent is further chosen so that it also acts to cross-link the film-forming material by means of the hydroxyl groups in the film former to produce a partially or fully cured three-dimensional film with thermosetting characteristics.

Suitable acids are the aromatic tri-hydroxy-carboxylic acids such as gallic acid, and the various dihydroxybenzoic acids. As esterifying alcohols we use at least a dihydric alcohol and preferably a polyhydric alcohol, as the ester should preferably be formed with a free hydroxyl group as indicated above, which is available for reaction with the cross-linking agent. Suitable esterifying alcohols include those with a molecular weight of at least 62, i.e., ethylene glycol or the various polyethylene glycols, but it is preferable to avoid using those with a relatively high molecular weight, because, as the molecular weight increases, the relative proportion of active sites for cross-linking diminishes. We prefer to use polyethylene glycols with a molecular weight below 600. Other alcohols which may be used are pentaerythritol, sugars, starches, celluloses and polyvinyl alcohols.

In some circumstances the film-forming material (a) may be the alcohol of (b) with which the aromatic carboxylic acid is esterified, so that components (a) and (b) are combined. For example, this may be the case where the film-forming material is a polyvinyl alcohol, which is esterified with the tri-hydroxy or di-hydroxy substituted aromatic carboxylic acid, e.g. gallic acid, to form the water-soluble ester.

As a cross-linking agent, we prefer to use an aminoplast, i.e., a material having one or more melamine rings substituted with either methylol or esterified methylol groups on the melamine ring or rings. In the case of esterified methylol groups the speed of reaction increases with increasing volatility of the alcohol used, so that the methanol ester will react faster than the n-butanol ester, for example. As we need a rapid cure in most cases, we prefer to use a methanol derivative, and amongst the suitable commercially available materials are "Cymel 300" supplied by Cyanamide of Great Britain Limited and "Resimene 730" supplied by Monsanto Limited.

Cymel 300 has the structure illustrated below:

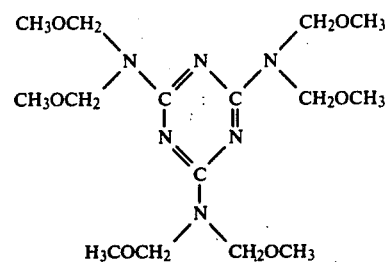

Resimene 730 is believed to have a similar structure but some of the amino groups in the molecule are unsubstituted and a proportion of methylol groups have not been esterified, and hence this cross-linking agent is possibly more reactive. We have found for our purposes that this difference in reactivity is of no consequence and that the materials are interchangeable in our formulations.

We believe that the chemical reactions which occur to form the resin with thermosetting characteristics and react the ester chemically into the resin system can be represented as follows where the amino-plast cross-linking agent is represented as $M(CH_2OCH_3)_n$

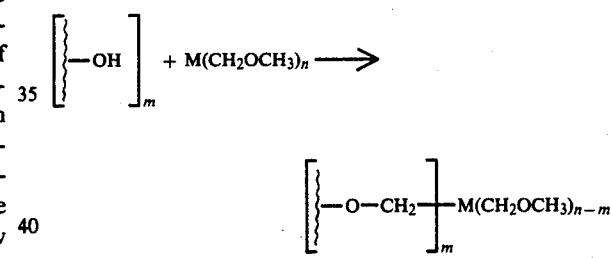

Taking gallic acid as the hydroxy substituted aromatic carboxylic acid the ester formation can be represented as

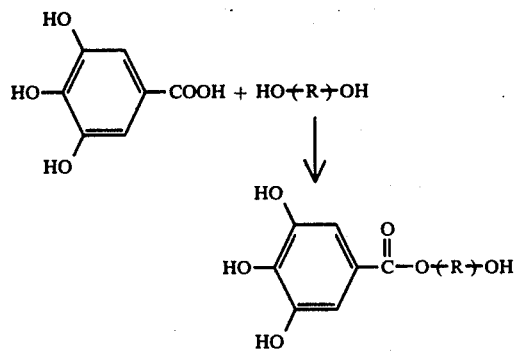

where R is an alkyl chain, the number of carbon atoms in the chain being any number from 2 to an upper limit dependent on the degree of polymerisation.

The possible reactions between the gallic acid ester and the amino-plast are:

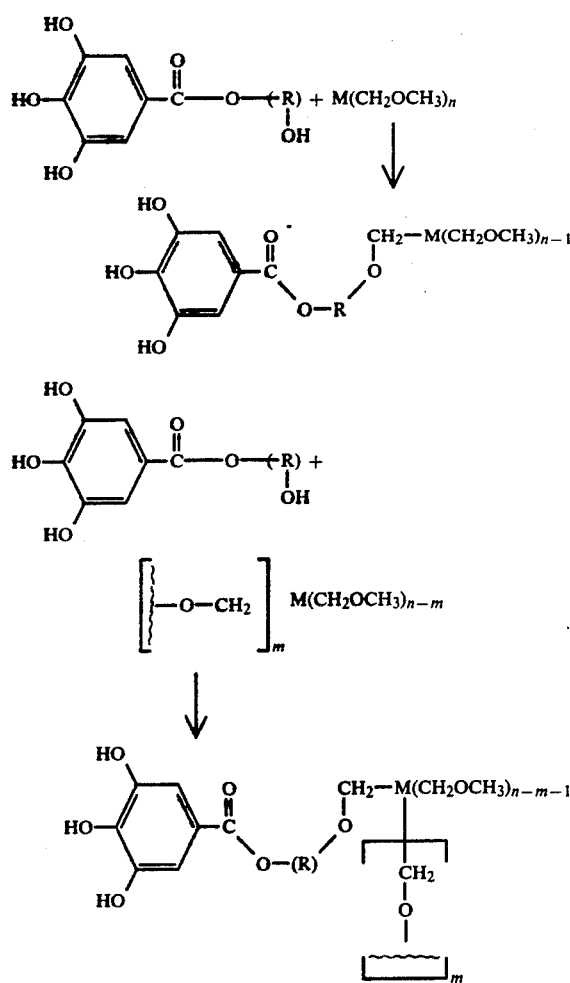

We believe the action of the alkaline environment is either to cause the ester to be liberated from the film, and then saponified to release the free acid, or to liberate the free acid directly. However, no matter which theory is correct, it has become clear that retaining the ester in the coating by cross-linking the film former increases the overall effect of the ester on durability, probably by controlling or restricting its release into the aqueous cement matrix. We find that, using the same glass composition, the strength retention is increased first by the simple application of the free acid to the fibre and is further increased by the use of the same acid as an ester applied to the fibre, and still further by retaining the ester in the coating by the method of the present invention.

For application to continuous filament glass fibres, in addition to the essential components described above, the size composition will contain where necessary other materials to enable a suitable size to be formulated. Other normally-present components in a size formulation include silanes to assist the bonding of the film former to the glass surface, and size lubricants to lubricate the glass surface. British Patent specification No. 1,057,292 at page 1 line 23 to page 2 line 20, outlines the rigorous conditions which a size of this kind must be designed to withstand, and it will be clear that various additives are available to assist in preparing a suitable size. We have found that there is no difficulty in formulating a size composition which can be run satisfactorily on a continuous filament production bushing utilising, in the formulation of the film-forming materials, esters and cross-linking agents described above. No attempt has been made to investigate the various permutations and combinations of further components which can be added, once it was found possible to formulate a satisfactory size, and it became clear the essential ingredients presented no problems in size formulation for the man practised in the art.

The following specific examples illustrate the invention:

EXAMPLE 1

In order to demonstrate that the improvements produced by coating glass fibres according to the invention are due to the use in combination of the film-forming material, the ester and the cross-linking agent, and not obtained with only one or two of the components, a series of comparative tests were undertaken as described below.

Eight sizes were prepared based on the following general formulation:

|  | Wt % |
|---|---|
| Film-forming resin | 5 |
| Ester | 10 |
| Silane A187 ($\gamma$-glycidoxy propyl triethoxy ethoxy silane, sold by Union Carbide) used here as a linking agent | 0.5 |
| Arquad 12/50 (an alkyl quaternary ammonium chloride sold by Armour Hess) used here as a cationic wetting agent | 0.5 |
| A cross linking agent | 2.0 |
| Acetic acid to adjust pH to 4–4.5 | |
| Water to make up to 100% | |

Size I (no ester or cross-linking agent)

This was a known type of size composition, the ester and cross-linking agent being omitted from the above general formulation. The film-forming resin was formed by reacting the diglycidyl ether of bisphenol A with ethanolamine to make it water-soluble.

Size II (no cross-linking agent)

The film-forming resin in this case was the same as that used in Size I. The ester was a gallic acid—ethylene glycol ester. Again no cross-linking agent was incorporated. The ester was made by mixing together 1 mole of ethylene glycol ester. Again no coss-linking agent was incorporated. The ester was made by mixing together 1 mole of ethylene glycol and 0.5 mole gallic acid followed by the addition of a catalytic amount (0.008 moles) of toluene-4-sulphonic acid. The mixture was heated slowly to 160° C. and water of reaction removed by means of a Dean and Stark trap. The heating was continued until esterification had proceeded to the point where the product had a free acid content of 5–8%. The mole ratio of acid to alcohol was chosen so that the mono-substituted ester would be preferentially formed.

Size III (no ester)

This size was the same as size I, but a cross-linking agent was added in this case. It was the amino-plast referred to above, available under the trade name Resimine 730.

Size IV

This size was the same as size III except that the same ester as was incorporated in size II was used again in this formulation. Size IV was thus in accordance with the invention.

Size V (no ester)

This size was the same as size III except that the cross-linking agent used was the amino-plast referred to above, available under the trade name Cymel 300.

Size VI

This size only differed from size V in that the same ester as was used in sizes II and IV was added to this size. Size VI was thus like size IV apart from the use of the different cross-linking agent, and was in accordance with the invention.

Size VII

This size was the same as size VI except that the ester used was a gallic acid—glycerol ester made by mixing together 1 mole of glycerol and 3 moles of gallic acid. The preparation followed the same procedure as described for the gallic acid—ethylene glycol ester of size II.

Size VIII

This size was the same as size VI except that the ester used was a gallic acid—polyethylene glycol ester made using a polyethylene glycol sold under the Trade name PEG 300 by Union Carbide Ltd. The ester had a molecular weight of 300 and the acid to alcohol mol ratio was 1:1. The preparation of the ester otherwise followed the procedure described with reference to size II.

Each size was used to coat strands of fibres of a substantially alkali-resistant zirconia-containing glass having the following composition in mol %:

| | |
|---|---|
| $SiO_2$ | 69% |
| $ZrO_2$ | 9% |
| $Na_2O$ | 15.5% |
| CaO | 6.5% |

The pick-up of size on the strands was of the order of 2%. The different coated strands were then dried at 130° C., to cause cross-linking in the film-forming material and between the ester and the film-forming material where the cross-linking agent was present. The middle section of each coated strand was then encased in a block of ordinary Portland cement paste which was allowed to cure for 1 day at 100% R.H. and then kept for 28 days in water at 50° C. to produce an accelerated ageing effect. The tensile strength of the strand after sizing was determined, and the tensile strength of the encased part was measured after storage. The results of these strength measurements in $N/mm^2$ are given in Table I below. Because of the differences in size composition, and the resultant differing degree of mechanical damage caused during preparation of the strands for test, it is difficult to achieve a uniform start value for purposes of comparison. It is our experience in using this test that the final value after immersion at 50° C. is not influenced to any great extent by the initial start value. It is always important to place reliance on relative performance in a particular test series rather than to compare absolute values from one test to the next.

| | Start | After 28 days immersion at 50° C. |
|---|---|---|
| Size I | 1450 | 597 |
| Size II | 1400 | 655 |
| Size III | 1381 | 556 |
| Size IV | 1480 | 926 |
| Size V | 1546 | 474 |
| Size VI | 1540 | 785 |
| Size VII | 1474 | 867 |
| Size VIII | 1341 | 906 |

It will be seen that the final values in the case of sizes I, III and V which contain no ester in the formulation are of the same order. The addition of the ester in all cases gives an improved final value as can be seen for sizes II, IV, VI, VII and VIII. In the case of sizes IV, VI, VII and VIII, the action of a cross-linking agent has produced a further improvement over size II. In addition it can clearly be seen by direct comparison of the sizes which only differ by the presence of the ester that an improvement is due to the ester, i.e. comparing I against II, III against IV and V against VI.

EXAMPLE II

A series of tests using the same method as Example I was carried out to investigate the effects of varying the film-forming resin and of different levels of size picked up on the fibre strand. A range of curing or drying temperatures was also investigated for some of the sizes.

The sizes used were as follows:

Size IX

| | Wt % |
|---|---|
| Resin as in Example I (see size I) | 5 |
| Gallic acid - ethylene glycol ester (as in size II) | 10 |
| Silane A187 linking agent | 0.5 |
| Arquad 12/50 cationic wetting agent | 0.5 |
| Cymel 300 cross-linking agent | 2.0 |
| Acetic acid | 2.0 |
| Water to make up to 100% | |

Size X

This size was the same as size IX, except that the resin used was the reaction product of propylene glycol diglycidyl ether and ethanolamine, the two materials having been reacted to obtain a water-soluble resin.

Size IV

As described under Example 1.

The results obtained were as follows:

| Size | Run No. | % Pick-up | Drying (curing) temperature | Start | 28 days at 50° C. | 56 days at 50° C. |
|---|---|---|---|---|---|---|
| IX | 1 | 3% | 120° C. | 1070 | 889 | |
| | 2 | 1.5% | 130° C. | 1071 | 866 | |
| X | 1 | 0.8% | 130° C. | 904 | | 647 |
| | 2 | 0.8% | H.F. dried | 760 | | 588 |
| | 3 | 0.8% | H.F. dried | 827 | | 556 |
| | 4 | 2.0% | 130° C. | 1071 | 866 | 742 |
| IV | 1 | 2.0% | 120° C. | 1141 | 747 | |
| | 2 | 1.8% | 160° C. | 1171 | 628 | |
| | 3 | 2.0% | 130° C. | 1000 | 808 | |
| | 4 | 3.3% | 120° C. | 1193 | 731 | |
| | 5 | 9.3% | 120° C. | 1345 | 927 | |
| | 6 | 11.3% | 120° C. | 1571 | 873 | |

-continued

| Size | Run No. | % Pick-up | Drying (curing) temperature | Start | 28 days at 50° C. | 56 days at 50° C. |
|---|---|---|---|---|---|---|
| | 7 | 1.9% | 105° C. | 1071 | 682 | |
| | 8 | 2.2% | 130° C. | 1156 | 864 | |
| | 9 | 1.4% | 190° C. | 932 | 589 | |

The statement "H.F. dried" indicates that the size was dried and cured by high frequency heating, the effective temperature being at least 120° C. It can be seen that the strength retention in water at 50° C. was influenced by the quantity of size pick-up. In the continuous drawing of glass fibres it is difficult, with these sizes, to exceed a pick-up of 3%. In order to attain the higher values used with size IV, runs 5 and 6, it was necessary to use an overcoating technique. It will also be seen that the strengths measured after 28 days at 50° C. are of the same order of magnitude as those obtained after 28 days in Example 1 despite the differences in starting strengths.

EXAMPLE III

Glass-fibre reinforced cement composite boards were made using a spray-dewatering method, in which the cement and chopped strand glass fibres were sprayed into a mould and de-watered by suction. The cement used was:

| | |
|---|---|
| Ferrocrete rapid hardening Portland cement | 30 |
| Sand | 10 |
| Water | 15 |

The final water/cement ratio in the finished board was adjusted to 0.3 and the glass content was 5% (based on $$\frac{\text{weight of dry glass}}{\text{weight of solids + water}}).$$

The glass fibre used was of the composition set out above and had been sized with size X of Example II. Each board was cut into coupons 150×50 mm by 8 mm thick and the coupons were cured for 1 day at 100% R.H. followed by 6 days in water at 22° C. They were then stored in water at 50° C. and tested at various intervals up to 3 months. The Modulus of Rupture (MOR) and Impact Strength were measured as follows (MOR as N/mm$^2$, Impact Strength as Nmm/mm$^2$).

| Run | | Start | 14 days | 28 days | 56 days | 3 months |
|---|---|---|---|---|---|---|
| Size X | 1 - MOR | 33.3 | 32.6 | 30.4 | 23.9 | |
| | IMP | 28.3 | 15.4 | 12.7 | 9.9 | |
| | 2 - MOR | 36.4 | 32.5 | 28.8 | 23.0 | 19.1 |
| | IMP | 22.0 | 14.8 | 10.8 | 7.7 | 6.0 |
| Control (Size I) | MOR | 38.1 | 19.4 | 16.8 | 15.4 | 13.6 |
| | IMP | 28.5 | 5.6 | 3.3 | 2.0 | 2.0 |

It can be seen that, with accelerated testing over a comparatively long period, equal to many years in service, the boards containing the fibres coated according to the present invention showed marked improvements both in MOR and Impact Strength over the control.

EXAMPLE IV

Glass-fibre reinforced cement composite boards were made using a spray-dewatering method in which the cement and chopped strand glass fibres were sprayed into a mould and dewatered by suction. The cement used was:

| | |
|---|---|
| Supersulphated cement | 30 |
| Water | 13.5 |

The final water/cement ratio in the finished board was 0.26 and the glass content 5% (based on $$\frac{\text{weight of dry glass}}{\text{weight of solids + water}}).$$

The glass fibre used was of the composition set out above and had been sized with size X of Example II. Each board was cut into coupons 150×50 mm by 8 mm thick and the coupons were cured for 1 day at 100% RH followed by 28 days in water at 22° C. They were then stored in water at 50° C. and tested at various intervals up to 3 months. The Modulus of Rupture (MOR) and Impact Strength were measured as follows (MOR as N/mm$^2$, Impact Strength as Nmm/mm$^2$).

| Run | | Start | 14 days | 28 days | 56 days | 3 months |
|---|---|---|---|---|---|---|
| Control (No protective material | MOR | 26.7 | 26.1 | 24.6 | 19.7 | 19.7 |
| | IMPACT | 20.4 | 12.3 | 7.6 | 6.3 | 4.3 |
| Size X | MOR | 36.1 | 39.7 | 41.3 | 42.0 | 42.2 |
| | IMPACT | 21.4 | 22.1 | 17.3 | 19.4 | 18.4 |

Thus again a marked improvement is shown by boards incorporating glass fibres coated in accordance with the present invention.

EXAMPLE V

As mentioned above, a further improvement in durability of the glass fibres in cement has been observed where the cement incorporates reactive silica in the form of a pozzolanic material. This Example demonstrates the effect of using a proportion of a fine silica flour (Danish diatomite sold under the trade name DAMOLIN, consisting of 81.5% by weight SiO$_2$, with a particle size such that 50% are less than 30$\mu$ and none greater than 200$\mu$, as determined by the Coulter Counter method), with the same Ferrocrete rapid hardening Portland cement used in Example III. Strands of alkali-resistant glass fibres of the composition set out above were made up, some of them being coated with a standard polyvinylacetate (PVA) size and some with size X as described under Example II. The middle portions of the strands were incorporated in blocks of cement paste. For each type of coated strand, some of the blocks were of 100% Ferrocrete Portland cement and some of 80% Ferrocrete Portland cement and 20% Danish diatomite. The blocks were kept for 2 months in water at 50° C. to produce accelerated ageing, and the strands were then tested for tensile strength.

The results in N/mm$^2$ were as follows.

The percentage figures in brackets indicate the improvement over the PVA-sized fibre strand in 100% Portland cement.

|  | Ferrocrete 100% | Ferrocrete 80% Danish diatomite 20% |
|---|---|---|
| PVA-sized fibre | 460 | 640 (39.1%) |
| Size X-sized fibre | 570 (23.9%) | 920 (100%) |

The improvement produced by use of size X in the cement which incorporates 20% silica flour is thus greater than the sum of the improvements found by using size X in 100% Portland cement or by using 20% silica flour, in the cement with the conventionally-sized fibre, indicating a synergistic effect between the size composition of the present invention and the silica flour.

EXAMPLE VI

Further investigations on the same lines as Example V have been made using the same Ferrocrete rapid hardening Portland cement with varying proportions of a pozzolanic pulverized fly ash (PFA), and silica flour in the form of Danish diatomite (DAMOLIN as described above) and of a silica flour sold under the trade name ELKEM which consists of 96.7% by weight $SiO_2$ with a particle size such that 50% are less than $30\mu$ and none are greater than $110\mu$, as determined by the Coulter Counter method. Strands of the same glass fibre as before were used, sized with three different sizes for comparison, namely (1) the conventional PVA size, (2) a size as described in our British Patent specification No. 1,465,059 incorporating pyrogallol as a protective material dispersed in a carrier, and (3) size X as described above. The tensile strength of the strands was measured after varying periods, with the following results:

| Matrix | Size coating | Strand in cement Tensile Strength (N/mm²) Time in Water at 50° C. (months) | | |
|---|---|---|---|---|
| | | 0 | 1 | 2 |
| 100% Ferrocrete Cement | PVA | 1200 | 530 | 460 |
| | Pyrogallol | 1120 | 670 | 560 |
| | Size X | 1190 | 750 | 570 |
| 60% Ferrocrete 40% Pozzolan PFA | PVA | 1290 | 670 | 530 |
| | Pyrogallol | 1210 | 840 | 780 |
| | Size X | 1350 | 980 | 840 |
| 90% Ferrocrete 10% Danish Diatomite | Size X | 1220 | 1070 | 720 |
| 80% Ferrocrete 20% Danish Diatomite | PVA | 1120 | 790 | 640 |
| | Size X | 1230 | 1080 | 920 |
| 60% Ferrocrete 40% Danish Diatomite | PVA | 1140 | 1060 | 830 |
| | Size X | 1180 | 1240 | 1030 |
| 90% Ferrocrete 10% Elkem Silica | Size X | 1420 | 920 | 730 |
| 80% Ferrocrete 20% Elkem Silica | PVA | 1160 | 720 | 560 |
| | Size X | 1420 | 1010 | 850 |
| 60% Ferrocrete 40% Elkem Silica | PVA | 1080 | 980 | 940 |
| | Size X | 1330 | 1260 | 1230 |

These results confirm the further improvement in durability achieved by the use of a size composition according to the invention with a cement incorporating 10% to 40% of reactive silica.

We claim:

1. A method of coating glass fibres to protect them from deterioration in an alkaline environment, such as a Portland cement matrix, said method comprising the steps of applying to the glass fibres an aqueous composition containing a water-soluble film-forming material having free aliphatic hydroxyl groups in the molecule, a water-soluble ester formed by reaction of a tri-hydroxy- or di-hydroxy-substituted aromatic carboxylic acid with an alcohol having at least two hydroxyl groups in the molecule, and a cross-linking agent, and drying and curing the composition at elevated temperature so as to cause cross-linking of the hydroxyl groups of the film-forming material, thereby to form a thermoset film coating on the glass fibres which also retains the ester.

2. A method according to claim 1, wherein the ester contains at least one free unreacted aliphatic hydroxyl group in the molecule.

3. A method according to claim 1, wherein the film-forming material is the product of reacting an epoxide compound with a secondary amine in such manner as to remove all the epoxy groups originally present.

4. A method according to claim 1, wherein the film-forming material is the product of reacting an epoxide compound with a secondary amine in such manner as to remove such a proportion of the epoxy groups originally present as is necessary to make the product soluble in water or in dilute organic acids, such as acetic acid.

5. A method according to claim 3, wherein the epoxide compound is a product of reacting bisphenol A with epichlorhydrin.

6. A method according to claim 3, wherein the secondary amine is diethanolamine, morpholine, piperidine or pyrrole.

7. A method according to claim 1, wherein the film-forming material is the product of reacting epichlorhydrin with a secondary amine and subsequently reacting the product with a primary hydroxyamine such as ethanolamine.

8. A method according to claim 1, wherein the ester is an ester of gallic acid.

9. A method according to claim 1, wherein the ester is an ester of a dihydroxy benzoic acid.

10. A method according to claim 8, wherein the esterifying alcohol is ethylene glycol, glycerol or a polyethylene glycol with a molecular weight below 600.

11. A method according to claim 1, wherein the cross-linking agent is an amino-plast, having one or more melamine rings and substituted with methylol and/or esterified methylol groups.

12. A method according to claim 11, wherein the esterified methylol groups are esterified with methanol.

13. A method according to claim 1, wherein the aqueous composition is applied to continuous filaments of glass as the filaments are being drawn from a body of molten glass through a bushing, and the drying and curing is effected after the filaments have been grouped into bundles or strands and wound on to a former to give a cake.

14. A method according to claim 13, wherein the aqueous composition also contains a silane which assists in bonding the film-forming material to the glass surface.

15. A method according to claim 13, wherein the aqueous composition also contains a size lubricant to reduce friction between the coated surfaces of adjacent filaments.

16. Glass fibres coated by a method according to claim 1.

17. An aqueous coating composition for use in coating glass fibres by the method of claim 1, said composition containing a water-soluble film-forming material having free aliphatic hydroxyl groups in the molecule, a water-soluble ester formed by reaction of a tri-hydroxy- or di-hydroxy-substituted aromatic carboxylic acid with an alcohol having at least two hydroxyl groups in the molecule, and a cross-linking agent.

18. A cement composite material formed by incorporating coated glass fibres according to claim 16 in a cement matrix.

19. A cement composite material according to claim 18, wherein the cement matrix incorporates reactive silica.

20. A cement composite material according to claim 19, wherein the reactive silica is in the form of fine silica flour or of a pozzolanic material.

21. A cement composite material according to claim 19, wherein the cement matrix contains between 10% and 40% by weight of the reactive silica.

22. Glass fibres coated with an aqueous coating composition which contains a water-soluble film-forming material having free aliphatic hydroxyl groups in the molecule, a water-soluble ester formed by reaction of a tri-hydroxy- or di-hydroxy-substituted aromatic carboxylic acid with an alcohol having at least two hydroxyl groups in the molecule, and a cross-linking agent.

* * * * *